US007998294B2

(12) United States Patent
Obuchi

(10) Patent No.: US 7,998,294 B2
(45) Date of Patent: Aug. 16, 2011

(54) LABEL MANUFACTURING METHOD AND LABEL MANUFACTURING SYSTEM

(75) Inventor: Tatsuya Obuchi, Chiba (JP)

(73) Assignee: Seiko Instruments Inc. (JP)

( * ) Notice: Subject to any disclaimer, the term of this patent is extended or adjusted under 35 U.S.C. 154(b) by 230 days.

(21) Appl. No.: 12/380,372

(22) Filed: Feb. 26, 2009

(65) Prior Publication Data

US 2009/0211703 A1 Aug. 27, 2009

(30) Foreign Application Priority Data

Feb. 27, 2008 (JP) ................................ 2008-046071

(51) Int. Cl.
*B32B 41/00* (2006.01)

(52) U.S. Cl. ....... 156/64; 156/273.3; 156/359; 156/367; 156/384; 156/386

(58) Field of Classification Search .................... 156/64, 156/273.3, 359, 367, 384, 386, 499; 347/171, 347/220
See application file for complete search history.

(56) References Cited

U.S. PATENT DOCUMENTS 5,115,252 A * 5/1992 Sasaki .......................... 347/195
2005/0269033 A1* 12/2005 Kohira et al. ................ 156/538
2006/0130965 A1* 6/2006 Obuchi et al. ................ 156/320

FOREIGN PATENT DOCUMENTS

EP 0541064 A2 * 5/1993
EP 1052177 11/2000
EP 1382456 1/2004
EP 1602492 12/2005
EP 1602500 12/2005

* cited by examiner

*Primary Examiner* — George R Koch, III
(74) *Attorney, Agent, or Firm* — Adams & Wilks

(57) ABSTRACT

In a label manufacturing method, at least a part of a heat sensitive adhesive sheet is heated to develop adhesive properties by using a thermal head having heating elements and by using a transporting unit that transport the heat sheet to pass through a position contacting with the heating elements. Image data is generated on an image area of the sheet and an image editing process is performed so as to divide the image area into at least two types of parts that are set as heated and non-heated parts, respectively. An edited image obtained as a result of the image editing process is input as a heating pattern. The thermal head and the transporting unit are driven based on the input heating pattern and the heating elements are selectively operated in timed synchronization with the transportation of the sheet. In the image data generating step, the image area is displayed on a display as a binary image including a colored part and a non-colored part. The image editing process arbitrarily adjusts shapes, sizes, and positions of the colored part and the non-colored part, and sets one of the colored and non-colored parts as the heated part and the other of the colored and non-colored parts as the non-heated part.

24 Claims, 9 Drawing Sheets

LABEL MANUFACTURING METHOD AND LABEL MANUFACTURING SYSTEM

BACKGROUND OF THE INVENTION

1. Field of the Invention

The present invention relates to a label manufacturing method and a label manufacturing system for manufacturing a label made of a heat sensitive adhesive sheet having a heat sensitive adhesive layer formed on a single side of a sheet-like substrate, which normally exhibits no adhesive properties but develops adhesive properties when it is heated.

2. Description of the Related Art

Conventionally, the heat sensitive adhesive sheet having the heat sensitive adhesive layer that develops adhesive properties when it is heated has been commercialized. Such a heat sensitive adhesive sheet has advantages that the sheet before being heated can be handled easily because it does not have the adhesive properties and that it does not need release paper so that industrial waste is not produced. Further, this label made of the heat sensitive adhesive sheet is attached onto various articles and is used in many fields such as a display like a bar code or the like for a point of sale (POS) of products such as foods, a shipping tag for distribution and delivery, a baggage tag in a hotel or a vehicle, or a display of contents of a bottle, a can, a cartridge or the like.

In some applications, this label may be configured to have the adhesive portion and a non-adhesive portion formed side by side, and the adhesive portion and the non-adhesive portion are used as one set. For instance, displays having the same contents are formed on the adhesive portion and the non-adhesive portion, and the adhesive portion is attached onto an article while only the non-adhesive portion corresponding to the adhesive portion is cut off and is removed from the article so as to be saved as a copy. In this case, the adhesive portion that develops adhesive properties by being heated and the non-adhesive portion that is not heated and does not develop adhesive properties are mixed in one label.

Note that a thermal head that is usually used as a recording head of a thermal printer is used for heating the heat sensitive adhesive layer of the heat sensitive adhesive sheet in many cases (see Patent Documents 1 and 2). In this case, the heat sensitive adhesive layer of the heat sensitive adhesive sheet is pressed to the thermal head while the heat sensitive adhesive sheet is transported so that the entire surface or a part of the surface of the heat sensitive adhesive layer is thermally activated so as to develop adhesive strength. When the thermal head is used, it is relatively easy to dispose a heated part and a non-heated part mixedly in the heat sensitive adhesive layer. Usually, when the heat sensitive adhesive layer of the heat sensitive adhesive sheet is heated, the thermal head heats the heat sensitive adhesive layer based on a predetermined pattern. For instance, Patent Document 2 discloses to drive the thermal head by selecting any one of a plurality of pieces of control data. Since each piece of the control data includes a heating pattern (energizing pattern of each heating element of the thermal head), the thermal head operates in accordance with the heating pattern of the selected piece of control data so as to produce the adhesive portion (part in which the heat sensitive adhesive layer is thermally activated) and the non-adhesive portion (part in which the heat sensitive adhesive layer is not thermally activated) in the heat sensitive adhesive sheet.

[Patent Document 1] JP 2004-243606 A

[Patent Document 2] JP 2004-136972 A

According to the apparatus described in Patent Document 2, it is possible to dispose the adhesive portion and the non-adhesive portion mixedly in the heat sensitive adhesive sheet in accordance with any one of the plurality of pieces of control data (a plurality of heating patterns). According to this method, there are the same number of variations of label manufacturing methods as the types of heating patterns of the control data stored in advance. However, if it is required to manufacture many types of labels in small quantities, it is desired to set more various heating patterns. In that case, it is preferable to increase the number of pieces of control data stored in advance, which requires a corresponding increase in capacity of storage means. If the number of pieces of control data stored in advance is increased abruptly, many of pieces control data that will not actually be used may be stored, causing a possibility of increase in the capacity of the storage means in a meaningless way.

Further, even if a size or a shape of the label to be manufactured needs to be changed, it is impossible for a user to modify the heating pattern in a flexible manner. It is impossible to make an adhesive portion having a size or a shape that deviates from any one of the heating patterns included in the plurality of pieces of control data stored in advance. In addition, if a mechanical error (such as transport error of heat sensitive adhesive sheet) occurs in operation of the label manufacturing apparatus, it is impossible for the user to perform a fine adjustment of the heating pattern for correcting the error. In other words, the mechanical error in operation of the label manufacturing apparatus may cause the situation where an adhesive portion having a desired shape and a desired size cannot be formed, and the situation cannot be corrected.

SUMMARY OF THE INVENTION

Therefore, an object of the present invention is to provide a label manufacturing method and a label manufacturing system in which a needless heating pattern is not required to be stored, the user can perform setting, changing, and fine adjustment of a heating pattern freely, and an adhesive portion having a desired shape and a desired size can be formed accurately.

According to the present invention, a label manufacturing method for heating at least a part of a heat sensitive adhesive sheet to develop adhesive properties by using a thermal head having a plurality of heating elements and by using transporting means for transporting the heat sensitive adhesive sheet so as to pass the heat sensitive adhesive sheet through a position contacting with the heating elements of the thermal head, is characterized by including: generating image data as the heat sensitive adhesive sheet being one image area and performing an image editing process so as to divide the image area into at least two types of parts and to set one of the two types of parts as a heated part and the other part as a non-heated part; inputting an edited image obtained as a result of the image editing process as a heating pattern; and driving the thermal head and the transporting means based on the input heating pattern and selectively operating the plurality of heating elements of the thermal head in synchronization with timing of transporting of the heat sensitive adhesive sheet by the transporting means, to thereby heat at least a part of the heat sensitive adhesive sheet to develop adhesive properties.

According to an embodiment of the present invention, the image area may be displayed as a binary image including a colored part and a non-colored part on display means, and the image editing process may arbitrarily adjust shapes, sizes, and positions of the colored part and the non-colored part, and set one of the colored part and the non-colored part as the heated part and the other as the non-heated part. In addition, the image data may be generated as the heat sensitive adhesive sheet being an image area in matrix divided into dots having substantially the same size as a size of one of the heating elements, and each of the dots can be independently set as any one of the heated part and the non-heated part in the image editing process.

According to these methods, a label having a desired adhesive portion can be manufactured easily by utilizing the process for forming an image in the thermal printer.

Further, although the thermal head and the transporting means are driven based on the input heating pattern in the present invention, this includes the case where the thermal head and the transporting means are driven in accordance with the input heating pattern as it is and the case where the input heating pattern is corrected before the thermal head and the transporting means are driven in accordance with the heating pattern after the correcting. In the latter case, the input heating pattern is corrected, the thermal head and the transporting means are driven in accordance with the heating pattern after the correcting, and a plurality of heating elements of the thermal head are selectively operated in synchronization with the timing of transporting of the heat sensitive adhesive sheet by the transporting means. Thus, only a part of the heat sensitive adhesive sheet corresponding to the part set as the heated part in the heating pattern after the correcting is heated to develop adhesive properties. The heating pattern after the correcting may be obtained by correcting the input heating pattern so that a rim portion of the input heating pattern is expanded outward by a predetermined distance at least in one direction. In particular, the heating pattern after the correcting may be obtained by correcting the input heating pattern so that the rim portion of the input heating pattern is expanded outward by the predetermined distance at a leading end of the heat sensitive adhesive sheet in a transporting direction and at both end portions of the heat sensitive adhesive sheet in a width direction perpendicular to the transporting direction. With this structure, a risk of an unintended non-adhesive portion (non-heated part) occurring at the rim portion of the label can be reduced even if a certain mechanical error or the like causes a formation of a heated part shifted from a desired heating pattern.

In addition, the heating pattern after the correcting may be obtained by setting back an edge portion of the heated part by the predetermined distance at a boundary between the heated part and the non-heated part of the input heating pattern. With this structure, it is possible to avoid the difficulty in cutting off the label along the perforation that is formed at the position corresponding to the boundary between the heated part and the non-heated part of the input heating pattern, for instance, due to the adhesive portions (heated parts) disposed on both sides of the perforation, even if a certain mechanical error or the like causes the perforation to be shifted from the boundary between the heated part and the non-heated part.

A label manufacturing system according to the present invention is characterized by including: a label manufacturing apparatus including a thermal head having a plurality of heating elements and transporting means for transporting a heat sensitive adhesive sheet so as to pass the heat sensitive adhesive sheet through a position contacting with the heating elements of the thermal head, and heating at least a part of the heat sensitive adhesive sheet to develop adhesive properties; display means for displaying the heat sensitive adhesive sheet as the heat sensitive adhesive sheet being one image area; and input means for performing an image editing process for dividing the image area displayed on the display means into at least two types of parts and for setting one of the two types of parts as a heated part and the other part as a non-heated part, so as to input an edited image obtained as a result of the image editing process as a heating pattern to storage means.

According to the present invention, it is not necessary to store the heating pattern of the heat sensitive adhesive sheet for the thermal head in advance. It is possible to input a desired heating pattern as necessary in accordance with a form of the label to be manufactured. Therefore, compared with the case where the heating pattern is selected from several heating patterns stored in advance, the heating pattern can be set in a very flexible manner, and even a complicated heating pattern can be set elaborately and finely. Thus, an appropriate label corresponding to a need can be manufactured as necessary. Further, it is easy to perform modification or fine adjustment of a heating pattern that is once made.

In addition, if the desired heating pattern is corrected after being input, a malfunction due to occurrence of a mechanical error or the like can be minimized. In particular, if the correction is performed so that the rim portion of the input heating pattern is expanded outward by the predetermined distance at least in one direction, a risk of an unintended non-adhesive portion occurring at the rim portion of the label can be reduced, and hence it is possible to prevent an easy-to-peel label from being manufactured. Further, if the input heating pattern is corrected so that the edge portion of the heated part is set back by the predetermined distance at the boundary between the heated part and the non-heated part, it is possible to avoid the difficulty in cutting off the label along the perforation that is formed at the position corresponding to the boundary between the heated part and the non-heated part of the input heating pattern, for instance, due to the adhesive portions (heated parts) disposed on both sides of the perforation. Thus, a risk of tearing the label when it is cut off along the perforation can be reduced.

DETAILED DESCRIPTION OF THE PREFERRED EMBODIMENT

Hereinafter, embodiments of the present invention are described with reference to the drawings.

Figure 1:
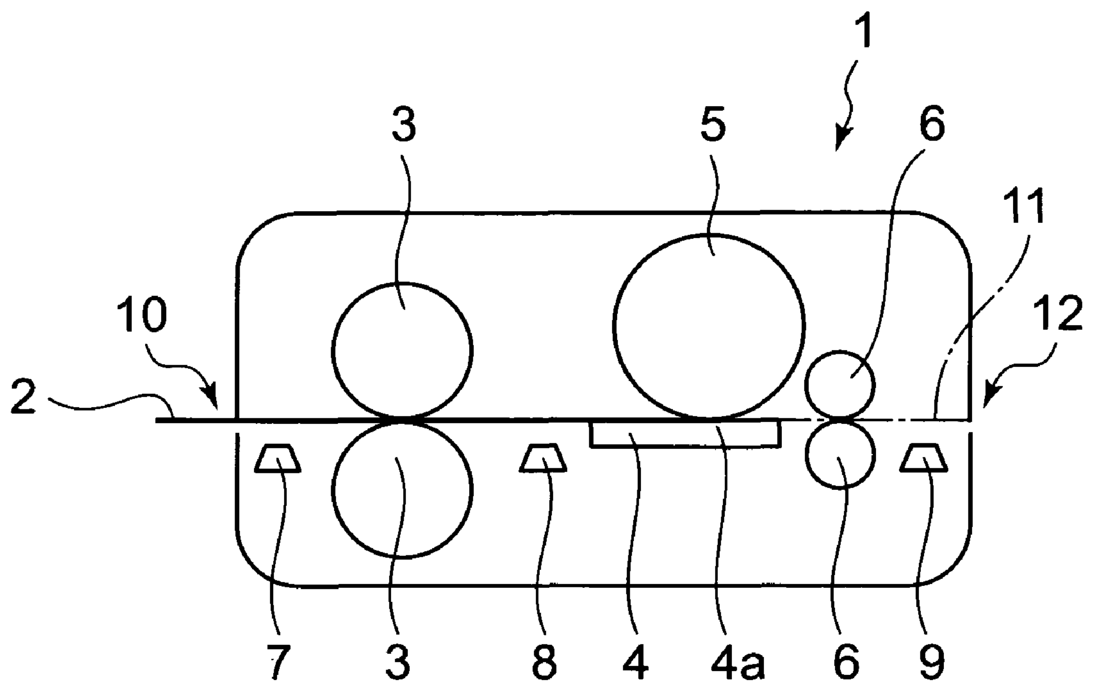
FIG. 1 is a schematic cross section illustrating an embodiment of a label manufacturing apparatus that is used for a label manufacturing method of the present invention.

First, a basic structure of a label manufacturing apparatus 1 that is used in the present invention is described with reference to FIG. 1. This label manufacturing apparatus 1 includes a pair of insertion rollers 3 for leading a heat sensitive adhesive sheet 2 to the inside the label manufacturing apparatus 1, a thermal head 4 for heating the heat sensitive adhesive layer of the heat sensitive adhesive sheet 2 so as to thermally activate the same, a platen roller 5 for sandwiching the heat sensitive adhesive sheet 2 between the same and the thermal head 4, a pair of discharge rollers 6 disposed on the downstream side of the thermal head 4, and sensors 7, 8, and 9. These members are described one by one from the upstream side in the transporting direction.

A sheet insertion detecting sensor 7 is disposed at the vicinity of a lead inlet 10 of the label manufacturing apparatus 1. The sheet insertion detecting sensor 7 is disposed so that its sensor portion faces a transporting path 11 of the heat sensitive adhesive sheet 2, and detects the presence or absence of the heat sensitive adhesive sheet 2 inserted from the lead inlet 10 to the vicinity of the insertion rollers 3.

The pair of insertion rollers 3 is disposed on the downstream side of the sheet insertion detecting sensor 7, and a contact between the rollers 3 is a part of the transporting path 11. One of the insertion rollers 3 may be a drive roller while the other may be a driven roller. A sheet detecting sensor 8 is disposed on the downstream side of the insertion rollers 3. The sheet detecting sensor 8 is disposed so that its sensor portion faces the transporting path 11, and detects an end portion of the heat sensitive adhesive sheet 2 transported from the insertion rollers 3 to the vicinity of the thermal head 4 and the platen roller 5.

The thermal head 4 and the platen roller 5 are disposed at the position to which the heat sensitive adhesive sheet 2 is led by the insertion rollers 3. The thermal head 4 may have a structure similar to that of a recording head that is used for a general thermal printer, and has a heat-generating portion 4*a* in which a plurality of heating elements, each of which is made of a small resistor, are arranged in the width direction (direction perpendicular to FIG. 1), for instance. The platen roller 5 is disposed to be opposed to the thermal head 4 so that the thermal head 4 and the platen roller 5 sandwich the heat sensitive adhesive sheet 2 on the transporting path 11. The platen roller 5 works as pressing means for pressing the heat sensitive adhesive sheet 2 to the heat-generating portion 4*a* of the thermal head 4 so as to perform good thermal activation, and rotates so as to transport the heat sensitive adhesive sheet 2.

The pair of discharge rollers 6 for discharging the heat sensitive adhesive sheet 2 from a discharging outlet 12 to the outside is disposed on the downstream side of the thermal head 4. Further, a sheet removal detecting sensor 9 is disposed at the vicinity of the discharge rollers 6. The sheet removal detecting sensor 9 is disposed so that its sensor portion faces the transporting path 11 of the heat sensitive adhesive sheet 2, and detects presence or absence of the heat sensitive adhesive sheet 2 before it is removed from the discharging outlet 12 to the outside.

Figure 2:
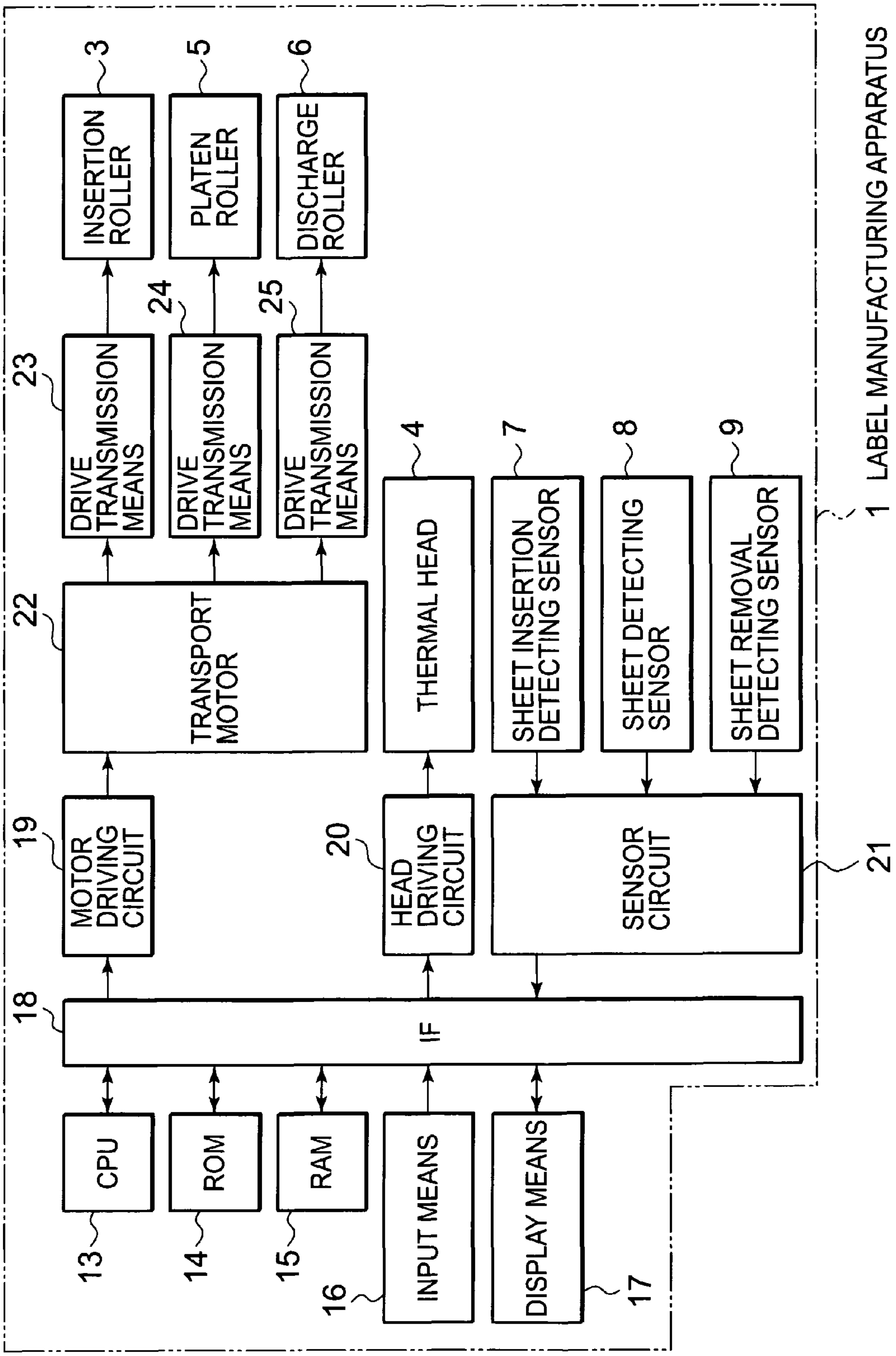
FIG. 2 is a block diagram illustrating an embodiment of a label manufacturing system of the present invention.

FIG. 2 illustrates a block diagram of this label manufacturing apparatus 1. A CPU (control means) 13 in the label manufacturing apparatus 1 refers to various data stored in a read only memory (ROM) 14 that is storage means while reading and writing data stored in a random access memory (RAM) 15 that is another storage means, so as to control the overall operation of the label manufacturing apparatus 1. The label manufacturing apparatus 1 further includes input means 16 and display means 17. It is possible to use a touch panel or the like made of a liquid crystal display panel or the like in which the input means 16 and the display means 17 are integrally provided. The CPU 13, the ROM 14, the RAM 15, the input means 16, and the display means 17 are connected to a motor driving circuit 19, a head driving circuit 20, and a sensor circuit 21 via an interface (IF) 18. Further, a transport motor 22 that is a stepping motor is connected to the motor driving circuit 19, the thermal head 4 is connected to the head driving circuit 20, and the three sensors 7, 8, and 9 are connected to the sensor circuit 21. As the transporting means, the insertion rollers 3, the platen roller 5, and the discharge roller 6 are connected to the transport motor 22 of this embodiment via drive transmission means 23, 24, and 25, respectively. In this embodiment, all the structural elements are disposed in the label manufacturing apparatus 1 as illustrated in FIG. 2, and the single label manufacturing apparatus 1 constitutes the label manufacturing system. However, it is possible to adopt another structure in which the label manufacturing apparatus 1 is connected to a host computer (not shown) so as to constitute the label manufacturing system. In this case, it is possible to dispose the input means 16 and the display means 17 in the structure illustrated in FIG. 2 not in the label manufacturing apparatus 1 but in the host computer.

Basic steps of manufacturing the label by the label manufacturing system described above are described with reference to the flowchart illustrated in FIG. 3.

First, the sheet insertion detecting sensor 7 confirms that the heat sensitive adhesive sheet 2 is inserted from the lead inlet 10 (Step S1). Then, the CPU 13 activates the transport motor 22 via the IF 18 and the motor driving circuit 19, whereby the rollers (transporting means) 3, 5, and 6 are rotated via the drive transmission means 23 to 25. Thus, the heat sensitive adhesive sheet 2 is transported along the transporting path 11 by one line toward between the thermal head 4 and the platen roller 5 (Step S2).

When the sheet detecting sensor 8 detects the leading end portion of the heat sensitive adhesive sheet 2 (Step S3), the CPU 13 drives the thermal head 4 via the IF 18 and the head driving circuit 20 at an appropriate timing. Thus, the heat-generating portion 4*a* of the thermal head 4 is heated. Though described more specifically later, the heating of the heat sensitive adhesive sheet 2 by the heat-generating portion 4*a* of the thermal head 4 and the transporting of the heat sensitive adhesive sheet 2 by the insertion rollers 3, the platen roller 5, and the discharge rollers 6 one by one line are repeated alternately, whereby the thermal activation of the heat sensitive adhesive layer of the heat sensitive adhesive sheet 2 is performed (Step S4).

After that, the heat sensitive adhesive sheet 2 is discharged from the discharging outlet 12 to the outside one by one sheet by the rotation of the discharge rollers 6 (Step S5). Further, although the heat sensitive adhesive sheets 2 that are cut in a desired label size are usually supplied to the label manufacturing apparatus 1, the heat sensitive adhesive sheet 2 like a long continuous paper sheet may be supplied to the label manufacturing apparatus 1. In the latter case, the heat sensitive adhesive sheet 2 is cut into a desired label size appropriately by cutter means (not shown) disposed on the upstream side or the downstream side of the thermal head 4. The basic steps of the label manufacturing method of this embodiment are as described above.

This embodiment has a main feature of the label manufacturing method described above in setting and controlling the pattern of the adhesive portion of the heat sensitive adhesive sheet 2, i.e., the pattern of the part heated by the thermal head 4. This feature is described below in detail.

The conventional label manufacturing apparatus, e.g., the apparatus described in Patent Document 2 performs heating of the heat sensitive adhesive sheet 2 in accordance with the heating pattern in the control data stored in advance, and it is possible only to select and set one of the plurality of heating patterns stored in advance while it is impossible to perform fine adjustment of the heating pattern.

In contrast, this embodiment has the structure in which the user can set the heating pattern freely. More specifically, in this embodiment, in the heat sensitive adhesive sheet 2, the pattern by which the heat sensitive adhesive sheet 2 is heated by the thermal head 4 is regarded as one image area so that the image data is generated and the pattern can be processed similarly to a so-called bitmap image. In other words, an image edit screen (binary image) is displayed on the display means 17, and the user views the image edit screen while operating the input means 16, whereby image editing can be performed and a result of the image editing can be supplied as the heating pattern by the thermal head 4. For instance, each heating element in the thermal head 4 can be driven in accordance with a result of the image editing so that the part set to black (colored part) in the image editing becomes the part in which the thermal head 4 is activated to heat the heat sensitive adhesive sheet 2 while the part set to white (non-colored part) becomes the part in which the thermal head 4 is not activated so as to be the non-heated part in which the heat sensitive adhesive layer is not thermally activated.

In the first place, the thermal printer uses the thermal head 4 for forming a desired image, i.e., for printing diagrams, characters or the like on the thermal recording paper with heated and colored portions. In this way, for forming diagrams, characters or the like on the thermal recording paper, the thermal printer usually performs activating and stopping of each of the heating elements in the thermal head 4 appropriately in synchronization with timing of transporting of the thermal recording paper one by one line, whereby the heated part (colored portion) and the non-heated part (non-colored portion) are arranged arbitrarily. In this case, a size of one heating element is regarded as one dot, a set of the dots (matrix) is regarded as an image area (bitmap image area), and to be heated or not is decided independently for each dot in the image area. Although diagrams, characters or the like are not formed in the present invention, the similar process is performed so that the user can perform setting, changing, and fine adjustment of the pattern of the heated part (adhesive portion) freely.

In this way, the present invention utilizes the image forming technology for the thermal printer, whereby the shapes and the sizes of the adhesive portion and the non-adhesive portion in the heat sensitive adhesive sheet 2 can be set arbitrarily. Further, the fine adjustment of the shapes and the sizes of the adhesive portion and the non-adhesive portion can be performed in units of the size of one heating element. More specifically, the display means 17 displays the image area (bitmap image area) schematically, and the user can operate the input means 16 while viewing the image area displayed on the display means 17 for selecting to be heated or not for each of the dots and finally for deciding the shapes and the sizes of the adhesive portion and the non-adhesive portion. In addition, even after the shapes and the sizes of the adhesive portion and the non-adhesive portion are once decided, the image area can be displayed again on the display means 17, and the user can operate the input means 16 while viewing the display for changing the selection to be heated or not for each dot. Thus, changing and fine adjustment of the shapes and the sizes of the adhesive portion and the non-adhesive portion can be performed.

Since a normal label has a shape that is not so complicated, the pattern of the adhesive portion is decided by selecting any one of the heating patterns of the control data stored in advance in the conventional method. In the present invention, however, to be heated or not can be selected for each dot in the image area as described above. This structure is based on noting flexibility that the user can perform setting, changing, and fine adjustment freely rather than the complexity of the shape. As a result, it is not necessary to store various heating patterns in advance for forming the adhesive portion of a desired shape and a desired size. In addition, it is possible to perform the control on the heating pattern as described below so that much merit can be obtained. Here, the effective control method is described, which is realized for the first time by utilizing the image forming technology for enabling setting shapes and sizes of the adhesive portion and the non-adhesive portion arbitrarily.

In general, it is important in particular to make the rim portion of the adhesive label be attached firmly in order that the adhesive label is attached to an article and is hardly removed. If a non-adhesive portion exists on the rim portion of the adhesive label, a force to remove the adhesive label can be exerted easily at the non-adhesive portion as a starting point. It is desirable that the adhesive portion be held stably by the article for a long period of time also for a label having the adhesive portion and the non-adhesive portion disposed in a mixed manner. Therefore, the adhesive portion is usually disposed so as to extend to the rim portion of the label. However, if a mechanical error (e.g., transport error of heat sensitive adhesive sheet) occurs in the operation of the label manufacturing apparatus, the adhesive portion may be formed only within the area having the outer rim set back inwardly from the rim portion of the label. In this case, an unintended non-adhesive portion may be generated in the rim portion of the label, and hence the label may be removed easily at the non-adhesive portion as a starting point.

Therefore, in this embodiment, the heating pattern is corrected so that the heated part expands to the outside of the rim portion of the heat sensitive adhesive sheet for heating a wide area. Since the heated area expands to the outside of the heat sensitive adhesive sheet, the unintended non-adhesive portion is prevented from being generated in the rim portion of the label even if a certain quantity of error occurs in the heated position, thereby reducing a possibility that the label is easily peeled off.

Further, in general, if the label to be formed includes the adhesive portion and the non-adhesive portion that are formed side by side as a pair, a certain usage can be considered in which the adhesive portion is attached to an article and then only the non-adhesive portion is cut off and is removed from the article as a copy. In this case, in order that the non-adhesive portion can be cut off easily, a perforation may be provided to the boundary between the adhesive portion and the non-adhesive portion. It is desirable from a viewpoint of manufacturing process that the perforation be formed at least before the heat sensitive adhesive sheet 2 is heated to develop adhesive properties. Therefore, with the perforation being as a center line (boundary), one side is heated to be the adhesive portion while the other side is not heated to be the non-adhesive portion.

However, the perforation can be shifted from the boundary between the adhesive portion and the non-adhesive portion because of a mechanical error in operation of the label manufacturing apparatus (such as transport error of heat sensitive adhesive sheet). In this case, it is not so difficult to cut off the label along the perforation if the non-adhesive portion is formed so as to include the perforation. However, if the adhesive portion is formed so as to include the perforation, it is difficult to cut off the label along the perforation because a part of the adhesive portion attached to the article has to be peeled off. Therefore, there is a high possibility that the label is torn at a part other than the perforation.

Therefore, in this embodiment, the edge portion of the adhesive portion (heated part) is controlled to be a position set back from a predetermined position at the boundary portion between the adhesive portion and the non-adhesive portion. In other words, the boundary between the adhesive portion and the non-adhesive portion is shifted from the correct position decided in accordance with the shape and the size of the label to be manufactured, by a little distance (approximately a few millimeters) to the adhesive portion side. Therefore, if the perforation is provided, the boundary between the adhesive portion and the non-adhesive portion is set at a position shifted to the adhesive portion side from the perforation. With this structure, if a position error occurs in the boundary between the adhesive portion and the non-adhesive portion because of a mechanical error in operation of the label manufacturing apparatus (transport error of heat sensitive adhesive sheet) or the like, a possibility of the adhesive portion being formed beyond the position of the predetermined boundary can be greatly reduced. This is particularly effective in the case where a perforation is formed in the heat sensitive adhesive sheet, and it is possible to reduce a possibility that the adhesive portion is formed so as to include the perforation. Therefore, it is possible to reduce difficulty in separating the label along the perforation and a risk of tearing the label.

Figure 4A:
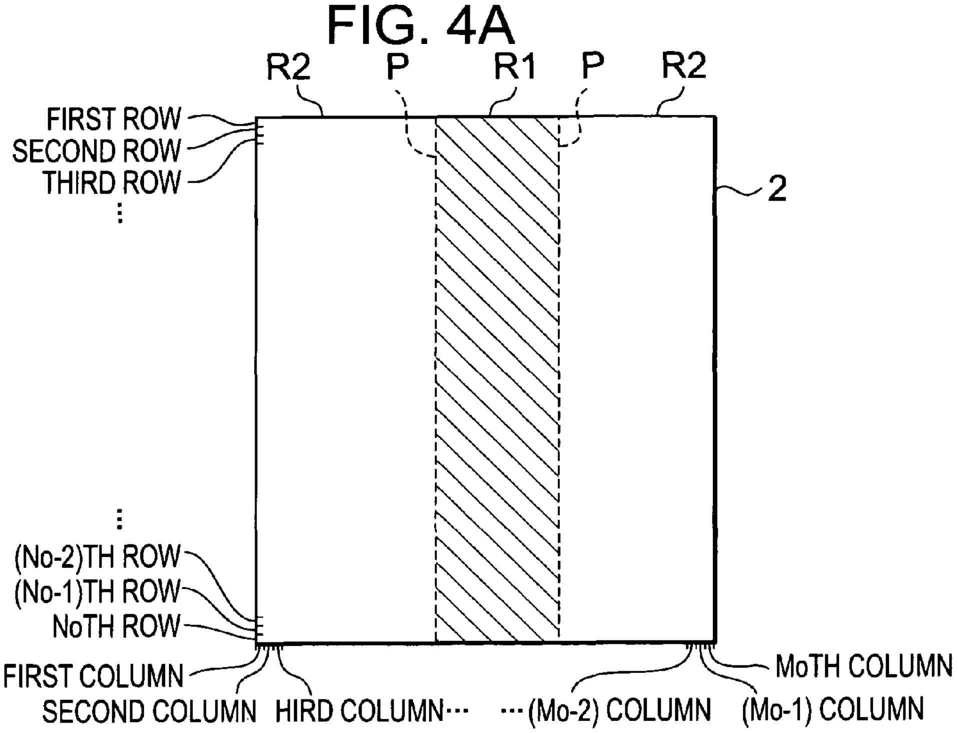
FIG. 4A is a schematic diagram illustrating an image of a desired heating pattern.
Figure 4B:
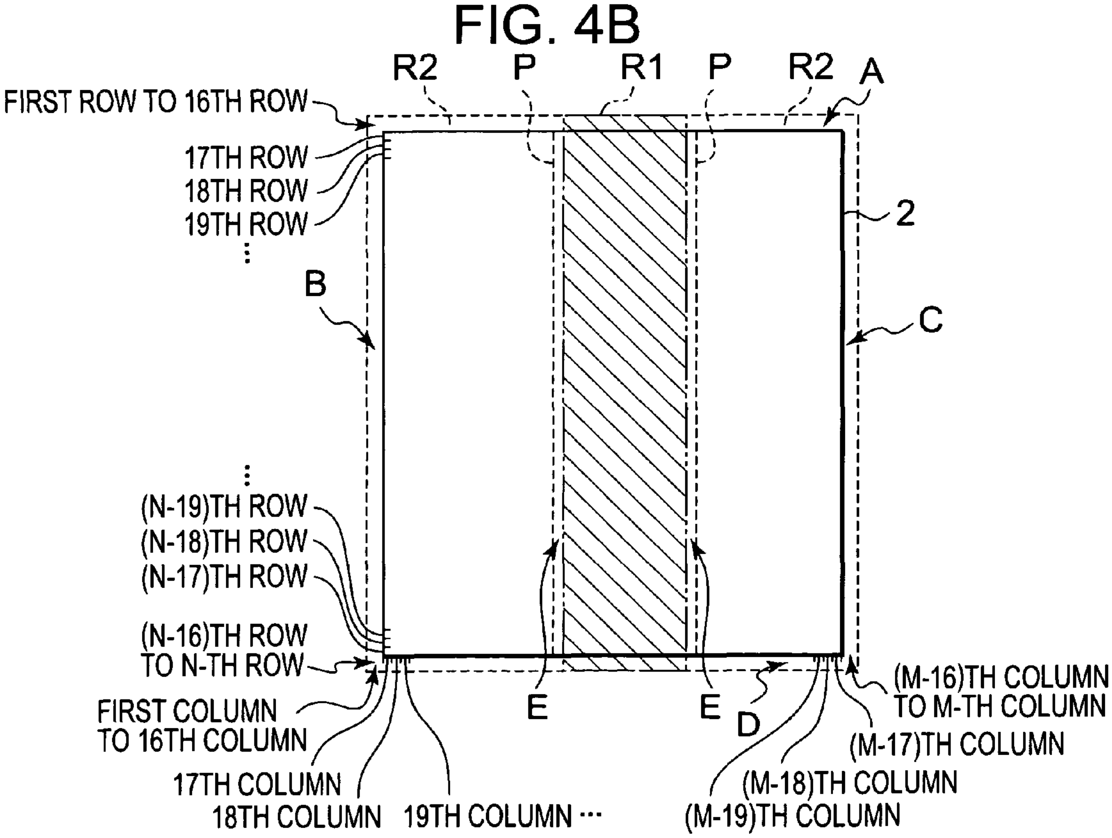
FIG. 4B is a schematic diagram illustrating an image of a heating pattern after a correction.

The two control methods described above are not aimed at realizing strictly precisely the desired heating pattern for manufacturing a desired label on the basis of computation (theory), but it is for minimizing a malfunction, i.e., securing security by correcting the desired heating pattern purposely, even if a mechanical error in operation of the label manufacturing apparatus (such as transport error of heat sensitive adhesive sheet 2) occurs. An example in which these two control methods are simultaneously embodied is illustrated in FIG. 4A-4B. FIG. 4A illustrates heating data before the correction, and FIG. 4B illustrates heating data after the correction. Further, the scales of sizes are inaccurate partially in FIG. 4A-4B, for a purpose of easy view of the diagram.

In the heating data before the correction illustrated in FIG. 4A, the boundary between a heated part R1 (illustrated with hatching) and a non-heated part R2 (illustrated without hatching) matches a perforation P. Further, in the rim portion, the edge of the heat sensitive adhesive sheet 2 matches the edge of the heated part R1. This is the desired heating pattern for manufacturing the desired label on the basis of computation (theory). Then, in this embodiment, the heating pattern is corrected by the same method as the image editing method using the bitmap image. The correction is to expand the heating pattern outward at each of the rim portions in the first place. More specifically, as to the first row of the heat sensitive adhesive pattern in the transporting direction, the heating pattern that is the same as the first row is expanded by a few millimeters (e.g., 2 mm) (see section A of FIG. 4B).

Further, in both sides of the heat sensitive adhesive sheet 2 (both end portions in the direction perpendicular to the transporting direction), the heating pattern that is the same as the outmost end portion of the heating pattern of each row is expanded outward from the outmost end portion by a few millimeters (e.g., 2 mm). In other words, the image area having a width larger than the heat sensitive adhesive sheet 2 by 4 mm is set. Then, in the row that is set so that the outmost end portion of the desired heating pattern in the width direction is to be heated, the area of 2 mm of the outmost portion in the image area is also set to be heated. In the row that is set so that the outmost end portion of the desired heating pattern in the width direction is set not to be heated, the area of 2 mm of the outmost portion in the image area is also set not to be heated. Such the setting is performed in every row with respect to both end portions in the width direction. Thus, as illustrated in the sections B and C of FIG. 4B, the desired heating pattern can be expanded at both end portions in the width direction perpendicular to the transporting direction.

Further, concerning the last row of the heat sensitive adhesive pattern in the transporting direction, the heating pattern that is the same as the last row thereof is expanded by a few millimeters (e.g., 2 mm) (see the section D of FIG. 4B).

On the other hand, in the area where the heated part R1 and the non-heated part R2 are adjacent to each other in the desired heating pattern, the edge of the heated part R1 is set back by a few millimeters (e.g., 2 mm) so that the non-heated part R2 is expanded as illustrated in the section E of FIG. 4B).

The correction of the heating pattern according to this embodiment is for performing the control method described above. Note that FIG. 4B illustrates the adhesive portion R1 and the non-adhesive portion R2 of the heat sensitive adhesive sheet 2 in the case where a mechanical error in operation of the label manufacturing apparatus 1 (such as transport error of heat sensitive adhesive sheet 2) has not occurred as a result of the heating process performed in accordance with the heating pattern corrected as described above. If a certain error has occurred, the position of the heat sensitive adhesive sheet 2 may be shifted in any of the directions from the state illustrated in FIG. 4B. However, the maximum value of this error can be predicted to some extent, and hence the heating pattern is corrected in advance so as to suppress a malfunction due to the error by expecting the maximum error in this embodiment. For instance, the maximum error is considered to be approximately 2 mm in an ordinary mechanism. Therefore, in this embodiment, the rim portion of the heating pattern is expanded in each direction by 2 mm each, and the boundary between the adhesive portion R1 and the non-adhesive portion R2 is shifted to the adhesive portion R1 side by 2 mm. Therefore, even if the position of the heat sensitive adhesive sheet 2 is shifted from the heating pattern by approximately 2 mm in any direction, it is possible to prevent an unintended non-adhesive portion from occurring in the rim portion of the label or the adhesive portion R1 from being formed to include a tear-off line (the perforation P is formed in some cases). Thus, the label can be prevented from being easily peeled off, and the non-adhesive portion R2 can be cut off easily, whereby a risk of tearing the label can be reduced.

EXAMPLE

More detailed specific example of the label manufacturing method including the two control methods according to the present invention is described.

Figure 5:
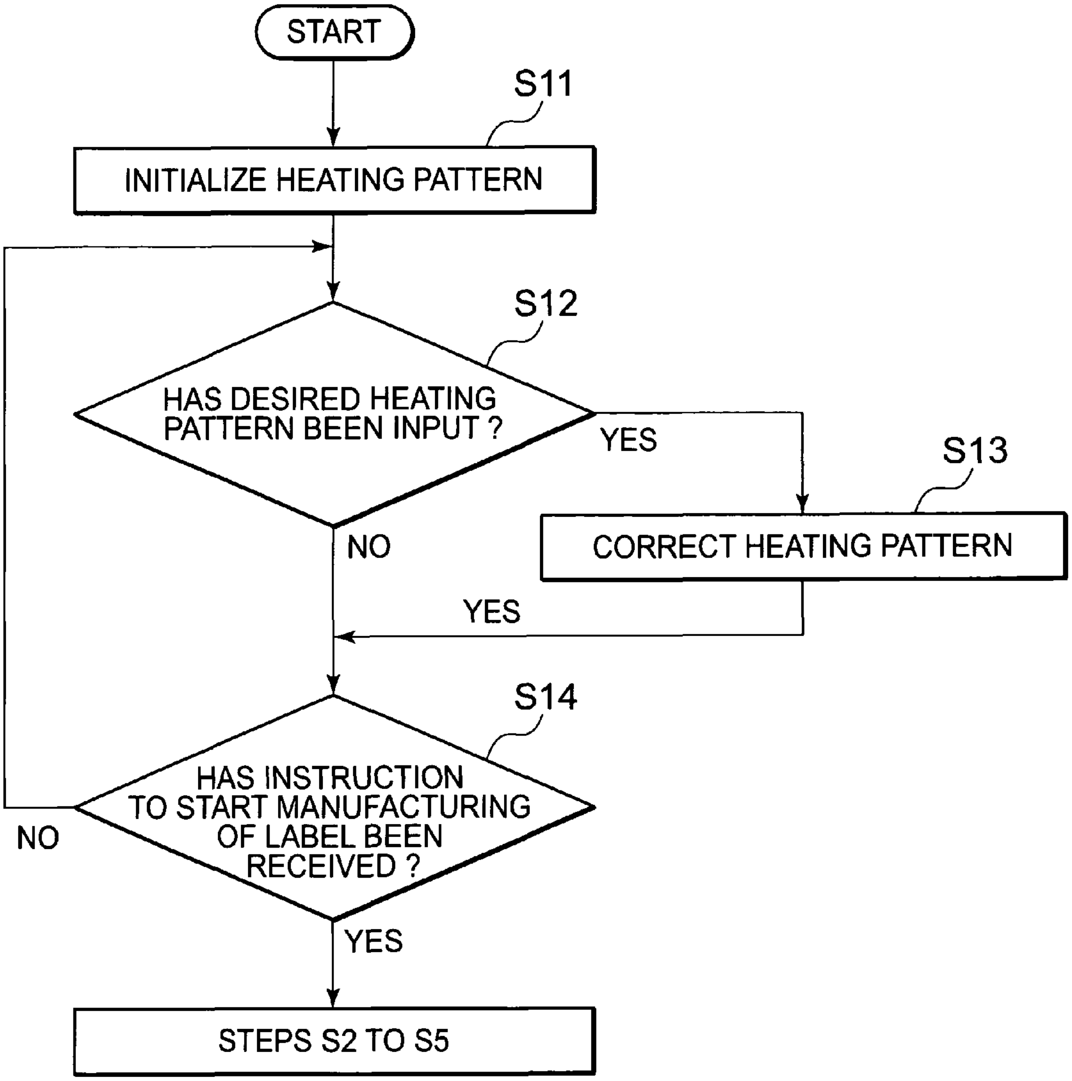
FIG. 5 is a flowchart illustrating steps performed before the basic steps illustrated in FIG. 3 of the embodiment of the label manufacturing method of the present invention.

As illustrated in FIG. 5, when the label manufacturing apparatus 1 starts to operate, initialization of the heating pattern is performed (Step S11). This means that data such as the heating pattern in the past manufacture of the label, which remains in the RAM 15, is erased so that the heating pattern (default heating pattern) of the initial data is once registered in the RAM 15. Note that the heating pattern of the initial data can be one for heating the entire surface. In this state, a new input of the heating pattern is waited. Then, when it is detected that the user has input the desired heating pattern by using the display means 17 and the input means 16 (Step S12), the heating pattern is corrected and is registered in the RAM 15 (Step S13).

Figure 6A:
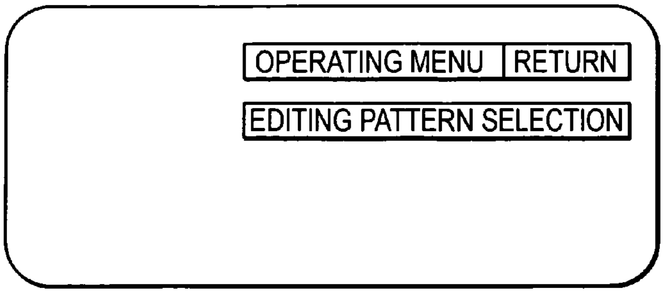
FIGS. 6A to 6E are schematic diagrams illustrating screens for inputting the desired heating pattern of the embodiment of the label manufacturing method illustrated in FIG. 5.
Figure 6B:
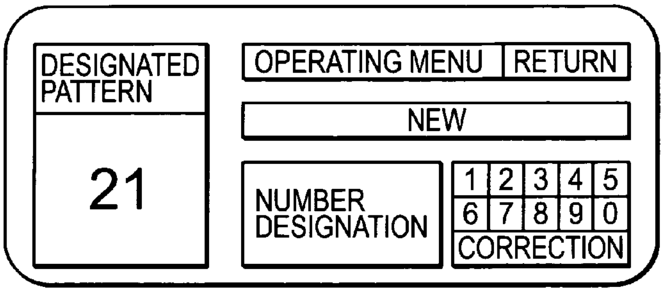
Figure 6C:
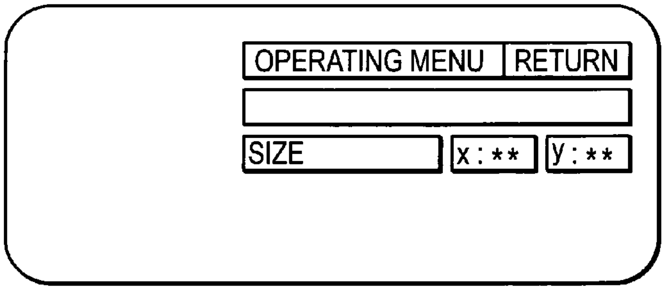
Figure 6D:
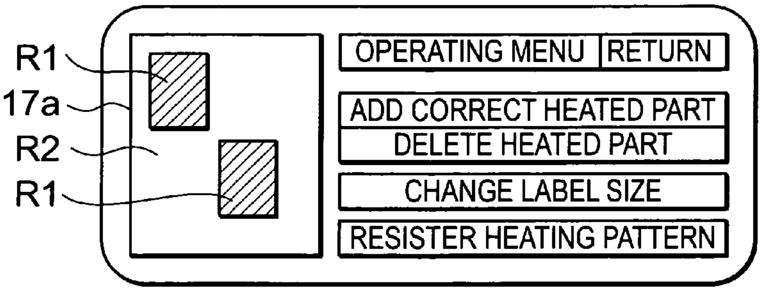
Figure 6E:
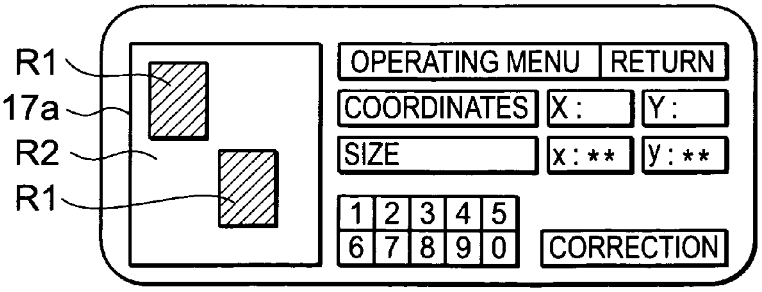
Figure 7:
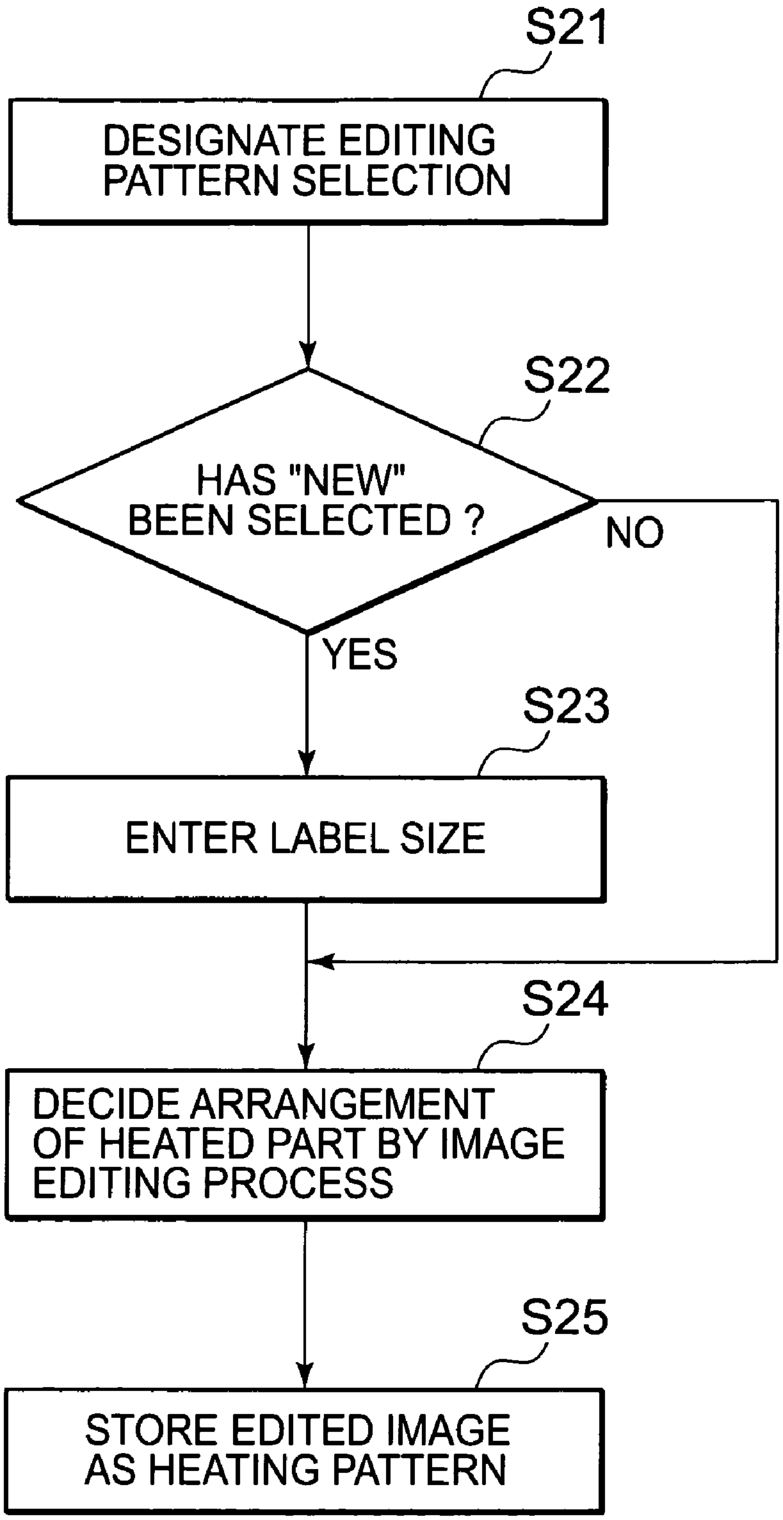
FIG. 7 is a flowchart illustrating detailed steps of inputting the desired heating pattern of the embodiment of the label manufacturing method illustrated in FIG. 5.

Here, a specific example of inputting the desired heating pattern by the user is described with reference to FIGS. 6 and 7. In this example, a liquid crystal touch panel is used, which works as the input means 16 as well as the display means 17. However, in the following description, the input means 16 and the display means 17 are described as separate components for convenience sake. This is to distinguish the individual functions of input and display different from each other.

First, editing pattern selection is designated by the input means 16 in the state where the initial menu screen (see FIG. 6A) is displayed on the display means 17 (Step S21). Then, the selection screen illustrated in FIG. 6B is displayed on the display means 17. On this stage, anyone generation of a new heating pattern and change of an existing heating pattern can be selected. In the former case, "new" is selected by the input means 16. In the latter case, the number of the heating pattern to be changed (heating pattern that is already stored) is entered by the input means 16 (Step S22). If the "new" is selected here, a size of the label to be manufactured is entered from the input means 16 on an input screen illustrated in FIG. 6C (Step S23). Based on this operation, a size and a shape of an image edit screen 17*a* are decided. Then, as illustrated in FIG. 6D, the image edit screen (binary image) 17*a* is displayed on the display means 17, "add or correct heated part", "delete heated part", "change label size", "register heating pattern" are shown as options of the next process. Therefore, "add or correct heated part" and "delete heated part" are selected appropriately, and the part displayed in black in the image edit screen 17*a* (heated part R1) is moved, deformed, expanded or contracted arbitrarily for deciding the desired location of the heated part R1 (Step S24). Further, although the moving process, the deforming process, or the expansion or contraction process may be performed on the image edit screen 17*a* as described above, it is possible to enter the coordinates or the size of the adhesive portion directly as illustrated in FIG. 6E for deciding the desired location of the heated part R1. The addition, the correction or the deletion of the heated part R1 can be set by a unit of one dot corresponding to the position and the size of the heating element. Then, if a size of the image edit screen 17*a*, i.e., the heat sensitive adhesive sheet 2 should be changed, "change label size" is selected on the screen illustrated in FIG. 6D. Then, the screen returns to the input screen illustrated in FIG. 6C, where the size of the desired label should be entered again. In this way, the desired location of the heated part R1 is decided and then "register heating pattern" is selected so that the edited image is stored in the RAM 15 as the heating pattern (Step S25). Thus, input of the desired heating pattern is completed. Further, in this example, the desired heating pattern is image data shown as a binary image in matrix of M0×N0, which is divided into total N0 rows from the first row to the N0th row and the number of heating elements of the thermal head 4 (here, regarded as total M0 columns) as illustrated in FIG. 4A.

Note that if the existing heating pattern should be changed, the number of the heating pattern to be changed is entered in Step S22. Then, input of the size of the label to be manufactured (Step S23) is omitted, the image edit screen (binary image) 17*a* is displayed on the display means 17 as illustrated in FIG. 6D. Therefore, the desired location of the heated part R1 is decided similarly to the above-mentioned description (Step S24), and is registered as the desired heating pattern (Step S25). In this case, when the changed image is registered as the desired heating pattern, it is possible to adopt the structure in which to overwrite or to register as new data can be selected, although the structure is not illustrated.

The heating pattern input by the user in accordance with Steps S21 to S25 as described above is the desired heating pattern on the basis of computation (theory) for manufacturing the desired label as illustrated in FIG. 4A, for instance. In this example, this input desired heating pattern is corrected (Step S13). The contents of the correction is to expand the heating pattern outward at each of the rim portions by a few millimeters (e.g., 2 mm), and to change the position of the edge portion of the heated part R1 to be set back from a predetermined position by a few millimeters (e.g., 2 mm) at the boundary portion between the heated part (adhesive portion) R1 and the non-heated part (non-adhesive portion) R2 as described above. The heating pattern after the correction is image data in matrix of (N0 rows plus 4 mm)×(M0 columns plus 4 mm) in size as illustrated in FIG. 4B. Further, one row and one column are set to be ⅛ mm each in this example, and hence it becomes (N0+32) rows×(M0+32) columns. If the sizes of the one row and one column are not ⅛ mm, the number of rows and the number of columns should be changed as a matter of course.

In this way, except for the correction of the heating pattern, the other controlling method can be set for heating the heat sensitive adhesive sheet 2. For instance, the heating pattern of the last row may be repeated continuously until the timing when the trailing end portion of the heat sensitive adhesive sheet 2 actually passes through the position facing the thermal head 4, or all the heating may be stopped at the timing when the trailing end portion of the heat sensitive adhesive sheet 2 reaches a few millimeters (e.g., 2 mm or 16 rows in this example) before the position facing the thermal head 4. These controlling methods can also be set in the ROM 14 or the RAM 15 in Step S13 or before the same in advance.

The heating pattern after the correction that is set as described above is illustrated in FIG. 4B. This heating pattern after the correction is a matrix of N rows×M columns (here, N=N0+32, M=M0 +32). The control of the thermal activation that is described below is performed in accordance with this heating pattern after the correction.

As described above, after the correction of the heating pattern is performed and the controlling method is set, an instruction to start manufacturing the label actually is waited. This instruction may be a signal that is generated when the user operates a specific switch (not shown) of the label manufacturing apparatus 1 or may be a signal sent out from the sheet insertion detecting sensor 7 when it detects the heat sensitive adhesive sheet 2 that is inserted by the user from the lead inlet 10 to the inside of the label manufacturing apparatus 1 (in this case, the step corresponds to Step S1 illustrated in FIG. 3). When such the instruction to start manufacturing of the label is received (Step S14), the label is manufactured in accordance with Steps S2 to S5 illustrated in FIG. 3. In Step S4, the heating is performed in accordance with the heating pattern after the correction that is corrected in Step S13 and the controlling method that is set in Step S13. This heating method performed in accordance with the heating pattern after the correction and the set controlling method are described in detail with reference to FIG. 8.

First, the transport motor 22 that is a stepping motor drives the rollers 3, 5, and 6 from the timing when the sheet detecting sensor 8 detects the leading end portion of the heat sensitive adhesive sheet 2 in Step S3, and the number of rows until the leading end portion of the heat sensitive adhesive sheet 2 reaches the computational position of a few millimeters (e.g., 2 mm) before the position contacting with the heat-generating portion 4*a* of the thermal head 4 is calculated in advance. This value can be calculated based on a distance between the sheet detecting sensor 8 and the heat-generating portion 4*a* of the thermal head 4 (e.g., 10 mm) and a transport distance of the heat sensitive adhesive sheet 2 per row (e.g., ⅛ mm). For instance, supposing that the distance between the sheet detecting sensor 8 and the heat-generating portion 4*a* of the thermal head 4 is 10 mm and the transport distance per row is ⅛ mm, the value is (10 mm−2 mm)/(⅛ mm)=64 rows.

Therefore, when the sheet detecting sensor 8 detects the leading end portion of the heat sensitive adhesive sheet 2 in Step S3, the heat sensitive adhesive sheet 2 is transported from the detected position by the number of rows decided in advance (64 rows in the example described above) (Step S4*a*). The position where the transporting is completed is the leading end position (first row) of the heating pattern after the correction (see FIG. 4B). Therefore, a variable n indicating the number of the row in the heating pattern is set as n=1 (Step S4*b*). Further, if this position is shown in the heating pattern before the correction (input desired heating pattern) illustrated in FIG. 4A, it is −2 mm, i.e., −16th row from the leading end position.

As described above, when the leading end portion of the heat sensitive adhesive sheet 2 reaches the position of 2 mm before the computational position contacting with the heat-generating portion 4*a* of the thermal head 4, the thermal head 4 performs the heating in accordance with the data indicating the heating pattern of the heating pattern after the correction at the leading end position (first row) transmitted by the CPU 13 from the RAM 15 to the thermal head 4 (Step S4*c*). Then, the rollers 3, 5, and 6 transport the heat sensitive adhesive sheet 2 by one row (Step S4*d*). Then, if it is confirmed that the variable n indicating the number of the row does not match a row number N of the last row (Step S4*e*), the variable n is incremented by one to be set as n=n+1 (Step S4*f*). Then, it is confirmed that the sheet detecting sensor 8 has not detected the trailing end portion of the heat sensitive adhesive sheet 2 (Step S4*g*).

After that, the heating (Step S4*c*), the transporting (Step S4*d*), the comparison between the variable n and the row number N of the last row (Step S4*e*), the increment of the variable n (Step S4*f*), and the confirmation that the sheet detecting sensor 8 has not detected the trailing end portion of the heat sensitive adhesive sheet 2 (Step S4*g*) are repeated for each row of the heat sensitive adhesive sheet 2.

Further, data of each row in the heating pattern after the correction are transmitted appropriately by the CPU 13 from the RAM 15 to the thermal head 4, and the thermal head performs the heating in accordance with the transmitted data in Step S4*c*. In other words, the control for each of the heating elements to be heated or not in accordance with the transmitted data is performed. The data transmission is performed at an appropriate timing before the heating (Step S4*c*), for instance, during the transporting (Step S4*d*) or during the heating (Step S4*c*) of the preceding row.

Here, the heating patterns of the first row to the 16th row after the correction are the same heating pattern, in which the heating pattern of the first row in the desired heating pattern (heating pattern before correction) input in Step S12 is expanded to both sides in the width direction by 2 mm (16 columns) each. In this heating pattern, from the first column to the 16th column are all the same heating pattern as the 17th column (corresponding to first column of the heating pattern before correction), and from the (M−16)th column to the M-th column are all the same heating pattern as the (M−17)th column (corresponding to M0th column of heating pattern before correction). Therefore, in the same row, from the first column to the 17th column are all the same heating or non-heating column, and from the (M−17)th column to the M-th column are all the same heating or non-heating column. As described above, as a result of the expansion of the heating pattern in the width direction, from the first column to the 17th column are all the same heating or non-heating column, and from the (M−17)th column to the M-th column are all the same heating or non-heating column in the same row. The same is true for all the rows in the heating pattern after the correction.

From the 17th row to the (N−17)th row are rows in which the heating pattern from the first row to the last row (the N0th row) in the heating pattern before the correction are expanded on both sides in the width direction by 2 mm (16 columns) each. In other words, the matrix of (17th row to (N−17)th row)×(17th column to (M−17)th column) in the heating pattern after the correction is completely the same as the matrix of (first row to N0th row)×(first column to M0th column) in the heating pattern before the correction. Further, the first row to the 16th row, the (N−16)th row to the N-th row, the first column to the 16th column, and the (M−16) the column to the M-th column in the heating pattern after the correction are portions obtained by correcting the input heating pattern to be expanded in the four directions.

In this way, the thermal activation of each row of the heat sensitive adhesive sheet 2 is performed in Steps S4*c* to S4*g* sequentially. When the variable n indicating the row number reaches the row number N of the last row (Step S4*e*), it is confirmed that the sheet detecting sensor 8 has not detected the trailing end portion of the heat sensitive adhesive sheet 2 (Step S4*g*) without performing the increment of the variable n (Step S4*f*). After that, with the variable n being fixed to N (in other words, it is confirmed that "n=N" holds in Step S4*e*, omitting Step S4*f*), the heating in accordance with the heating pattern of the N-th row (Step S4*c*), the transporting (Step S4*d*), and the confirmation that the sheet detecting sensor 8 has not detected the trailing end portion of the heat sensitive adhesive sheet 2 (Step S4*g*) are repeated.

When the sheet detecting sensor 8 detects the trailing end portion of the heat sensitive adhesive sheet 2 (Step S4*g*), the number of rows is counted from the time point of the detection until the portion of 2 mm before the trailing end portion of the heat sensitive adhesive sheet 2 reaches the position facing the heat-generating portion 4*a* of the thermal head 4. Further, the number of rows on the computation basis from the time point when the sheet detecting sensor 8 detects the trailing end portion of the heat sensitive adhesive sheet 2 in Step S4*g* to the timing when the portion of 2 mm before the trailing end portion of the heat sensitive adhesive sheet 2 reaches the computational position facing the heat-generating portion 4*a* of the thermal head 4 after the transport motor 22 that is the stepping motor drives the rollers 3, 5, and 6, is determined in advance. This can be determined based on a distance between the sheet detecting sensor 8 and the heat-generating portion 4*a* of the thermal head 4 (e.g., 10 mm) and a transport length per row (e.g., ⅛ mm). For instance, if the distance between the sheet detecting sensor 8 and the heat-generating portion 4*a* of the thermal head 4 is 10 mm and the transport length per row is ⅛ mm, the distance becomes as (10 mm−2 mm)/(⅛ mm)=64 rows.

Therefore, the heating (Step S4*c*) and the transporting (Step S4*d*) are repeated for 64 rows from the time point when the sheet detecting sensor 8 detects the trailing end portion of the heat sensitive adhesive sheet 2 in Step S4*g*. On this occasion, if it is already confirmed that "n=N" holds in Step S4*e* that was performed before, the heating based on the heating pattern of the N-th row is repeated without performing the increment of the variable n (Step S4*f*).

On the other hand, if it is not confirmed that "n=N" holds in Step S4*e* that was performed before while the sheet detecting sensor 8 detects the trailing end portion of the heat sensitive adhesive sheet 2 in Step S4*g*, "n=N" does not hold yet at the time point when the heating (Step S4*c*) and the transporting are started to repeat for 64 rows as described above. In this case, every time when the heating (Step S4*c*) and the transporting (Step S4*d*) are performed, the increment of the variable n (Step S4*f*) is performed. Then, if it is confirmed that "n=N" holds (Step S4*e*), the heating based on the heating pattern of the N-th row is repeated from the time point of the confirmation without performing the increment of the variable n (Step S4*f*).

Figure 8:
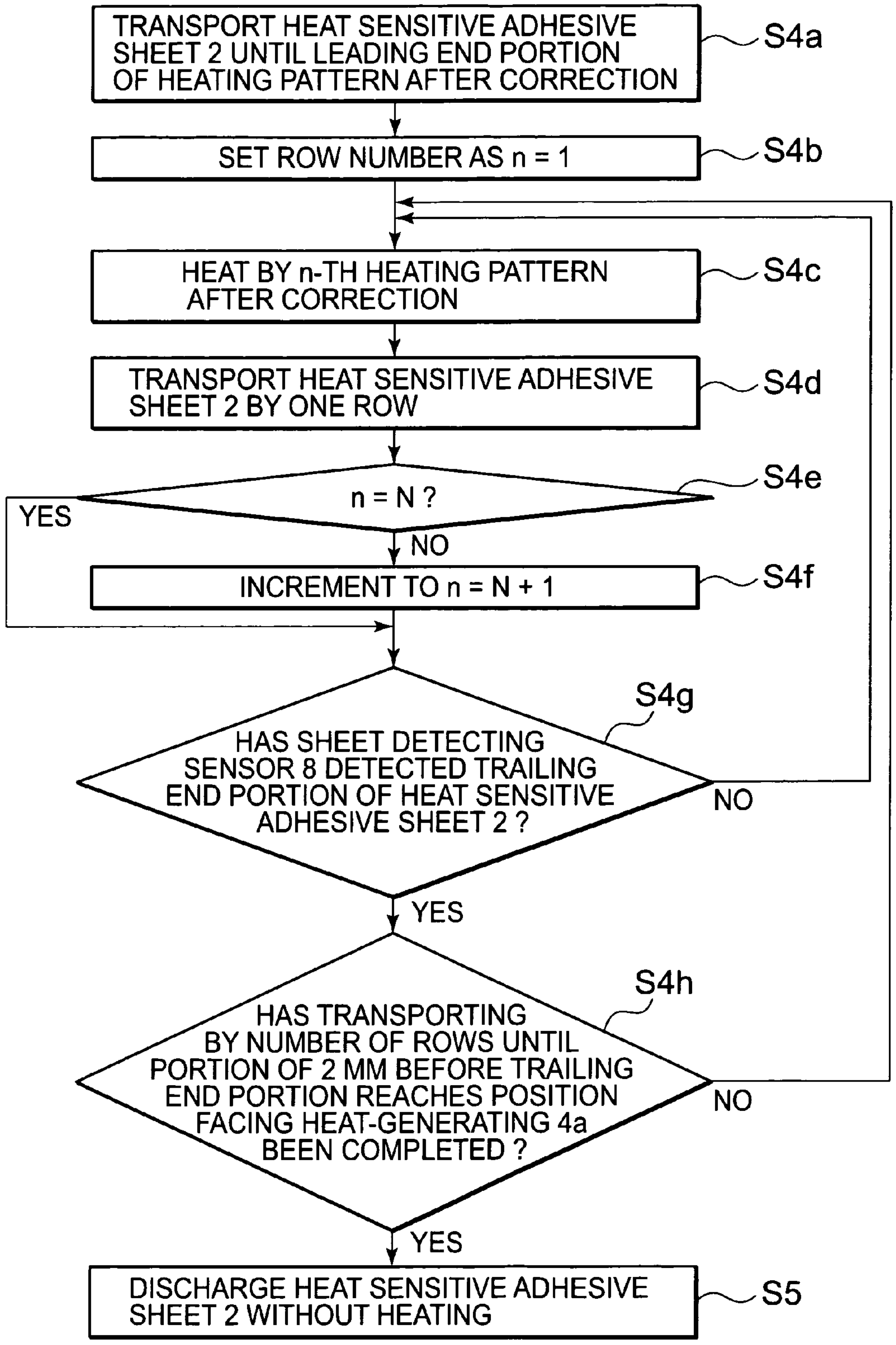
FIG. 8 is a flowchart illustrating detailed steps for thermal activation of the embodiment of the label manufacturing method illustrated in FIGS. 3 and 5.

Further, according to the flowchart illustrated in FIG. 8, the process passes each time through Step S4*g* in which it is confirmed whether or not the sheet detecting sensor 8 has detected the trailing end portion of the heat sensitive adhesive sheet 2 while the heating (Step S4*c*) and the transporting are repeated for 64 rows as described above. However, since it is already confirmed that the sheet detecting sensor 8 has detected the trailing end portion of the heat sensitive adhesive sheet 2 (Step S4*g*), it should be decided that the detection has been performed (Yes) when the process passes through Step S4*g* after that. Otherwise, no decision is performed in Step S4*g*. In any case, the counting is continued without resetting the number of rows that are already counted at the time point.

Figure 3:
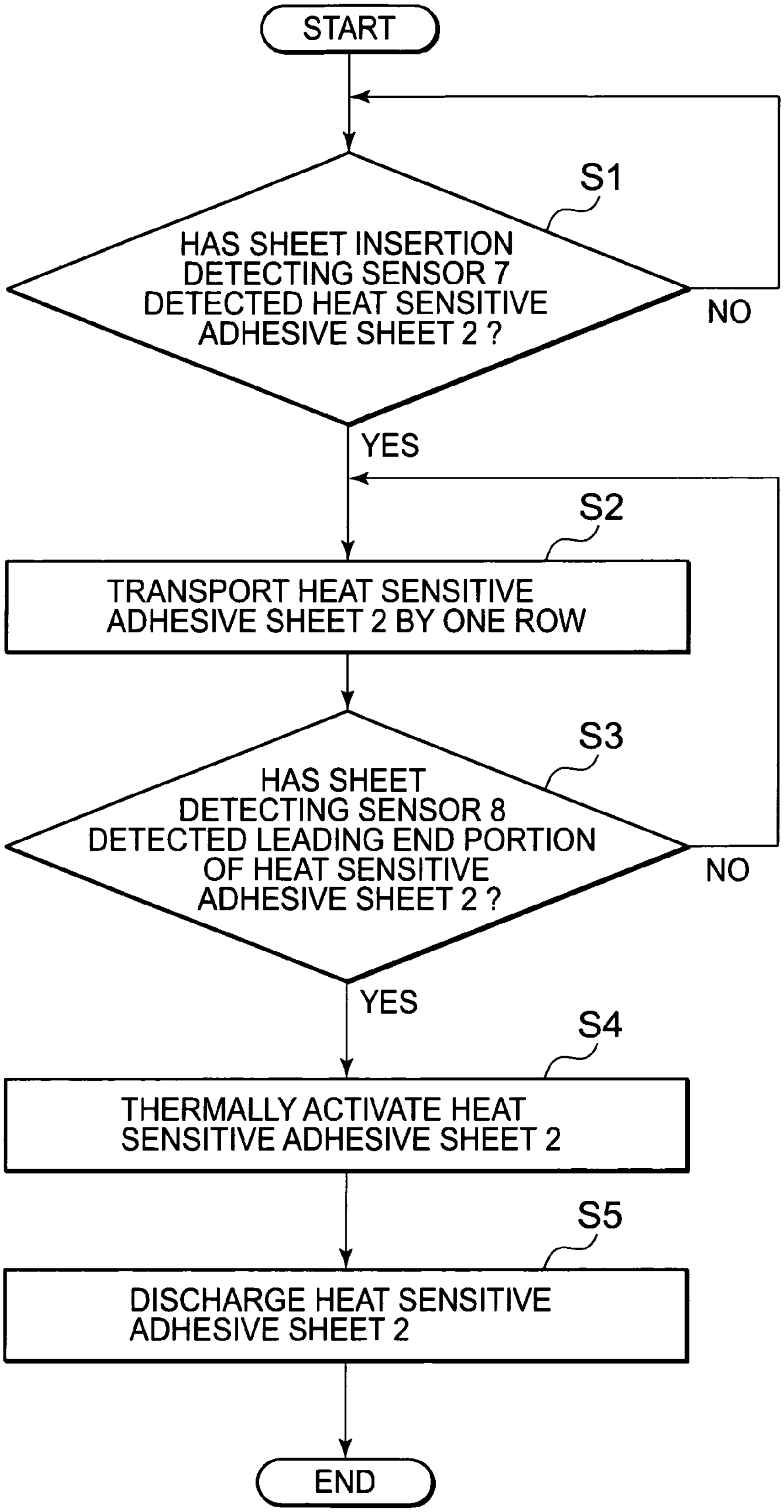
FIG. 3 is a flowchart illustrating basic steps of an embodiment of the label manufacturing method of the present invention.

Further, in any one of the cases described above, when the heat sensitive adhesive sheet 2 is transported by 64 rows from the time point when the sheet detecting sensor 8 detects the trailing end portion of the heat sensitive adhesive sheet 2 in Step S4*g* (Step S4*h*), the discharge roller 6 transports the heat sensitive adhesive sheet 2 so as to discharge the same from the discharging outlet 12 to the outside without performing the heating (corresponding to Step S5 of FIG. 3). This is the controlling method for stopping all the heating from the timing when the trailing end portion of the heat sensitive adhesive sheet 2 reaches the position of a few millimeters (e.g., 2 mm) before the position facing the thermal head 4 as described above.

Further, in the flowchart illustrated in FIG. 8, there may be the case where the sheet detecting sensor 8 cannot detect the trailing end portion of the heat sensitive adhesive sheet 2 even if it is confirmed that "n=N" holds in Step S4*e* and then the heating (Step S4*c*) based on the heating pattern of the N-th row, the transporting (Step S4*d*), and the confirmation that the sheet detecting sensor 8 has not detected the trailing end portion of the heat sensitive adhesive sheet 2 (Step S4*g*) are repeated continuously. In such a case, the heating based on the heating pattern of the N-th row and the transporting of one row are repeated continuously in accordance with Step S4*c* and Step S4*d*. This is the controlling method described above, which mainly repeats the heating pattern of the last row continuously until the timing when the trailing end portion of the heat sensitive adhesive sheet 2 actually passes through the position facing the thermal head 4. However, in connection with the other controlling method, it can be said to be the controlling method of repeating the heating pattern of the last row continuously until the timing when the portion of 2 mm before the trailing end portion of the heat sensitive adhesive sheet 2 actually passes through the position facing the thermal head 4.

Further, although it is not referred to in the above-mentioned description with reference to FIG. 8, the edge portion of the adhesive portion, i.e., the heated part is set back by a predetermined distance (e.g., 2 mm) at the position corresponding to the boundary between the adhesive portion and the non-adhesive portion of the heat sensitive adhesive sheet 2, from the heating pattern before the correction in this example. This is caused by the correction for setting back the edge portion of the heated part by a predetermined distance at the boundary between the heated part and the non-heated part of the heating pattern before the correction, which was performed together with the correction for expanding the heating pattern before the correction outward by a predetermined distance each in Step S13. In particular, if a perforation is provided to at least a part of the position corresponding to the boundary between the adhesive portion and the non-adhesive portion of the heat sensitive adhesive sheet 2, the heated part R1 is formed to be narrow so that the edge portion of the heated part R1 is located at the position shifted by approximately 2 mm to the heated part R1 side from the perforation P (boundary of desired heating pattern before the correction) (see FIG. 4B). These corrections are already performed on the heating pattern after the correction that was corrected in Step S13 and is used in Step S4*c*. Therefore, if the thermal head 4 works in accordance with the heating pattern after the correction, the heating control described above is performed automatically. The correction of the heating pattern is not performed every time the thermal head 4 performs the heating in Step S4*c*.

As described above, in this example, the respective rim portions of the desired heating pattern are expanded outward first in Step S13. Then, the correction is performed so that the boundary between the heated part R1 (adhesive portion) and the non-heated part R2 (non-adhesive portion) is shifted to the heated part R1 side (the edge portion of the heated part R1 is set back), and based on the heating pattern after the correction, the heating of the heat sensitive adhesive sheet 2 is performed. However, concerning the trailing end portion of the heat sensitive adhesive sheet 2 in the transporting direction, in addition to the correction, the heating is controlled so as to stop all the heating from the timing when the trailing end portion of the heat sensitive adhesive sheet 2 reaches the position of 2 mm before the position facing the thermal head 4. In addition, if the advancement of the trailing end portion of the heat sensitive adhesive sheet 2 is slow due to a certain reason so that it is necessary to perform the heating of the heat sensitive adhesive sheet 2 even after the last row (N-th row) in the desired heating pattern, the heating is controlled so as to repeat the heating pattern of the last row continuously. Therefore, concerning this trailing end portion, the heating based on the corrected heating pattern is not always performed. Therefore, in Step S13, it is not always necessary to expand the rim portion of the desired heating pattern outward in every direction, but the rim portion may be expanded outward only in a specific direction (e.g., directions other than direction of trailing end portion).

According to this example, the correction of the desired heating pattern enables to prevent an unintended non-adhesive portion from being generated in the rim portion of the label. Thus, a possibility that the label is removed easily can be reduced, and a risk of tearing the label can be reduced by preventing the adhesive portion R1 from being formed to include the tear-off line so that the non-adhesive portion R2 can be cut off easily. This setting back of the edge portion of the heated part is effective in particular if the perforation P is formed as the tear-off line.

Further, concerning the trailing end portion of the heat sensitive adhesive sheet 2 in the transporting direction, the heating is controlled so as to stop entirely from a little before the trailing end portion, thereby preventing the heat sensitive adhesive removed from the heat sensitive adhesive sheet 2 from attaching to the thermal head 4 and from remaining on the same. In addition, if it is necessary to heat the heat sensitive adhesive sheet 2 after the last row of the desired heating pattern, the control is performed so that the heating pattern of the last row is repeated continuously. Thus, even if a relatively large error occurs, an unintended non-adhesive portion can be prevented from occurring in the rim portion of the label. In addition, since it is not necessary to make the entire row be the adhesive portion, the adhesive portion is not provided more than needed.

In the above-mentioned description, the correction of the heating pattern and the heating control are performed by the CPU 13 incorporated in the label manufacturing apparatus 1 itself. However, it is possible to connect a host computer (not shown) to this label manufacturing apparatus 1 so as to constitute the label manufacturing system. In this case, the CPU 13 incorporated in the label manufacturing apparatus 1 itself controls the heating and the transporting, while the setting and the correction of the heating pattern (Steps S11 to S13) are performed by the host computer. In other words, the host computer includes the CPU, the ROM, the RAM, the input means 16 such as a mouse or a keyboard, and the display means 17 such as a liquid crystal display or a cathode ray tube. The label manufacturing apparatus 1 includes the CPU (control means) 13, the ROM (storage means) 14, and the RAM (storage means) 15 for controlling the operations of the transport motor 22, the thermal head 4, and the sensors 7, 8, and 9, but these components do not have functions of setting and correcting the heating pattern. Further, the host computer performs the setting and the correction of the heating pattern, and the heating data after the correction is transmitted from the host computer to the label manufacturing apparatus 1. The CPU 13 of the label manufacturing apparatus 1 controls the operations of the transport motor 22, the thermal head 4, and the sensors 7, 8, and 9 in accordance with the transmitted heating pattern. Further, in this case, setting of the CPU 13, the ROM 14, and the RAM 15 of the host computer may be performed for the setting and the correction of the heating pattern as described above. Alternatively, application software that is installed in the host computer may include a program for performing the setting and the correction of the heating pattern, whereby the CPU 13 can perform the setting and the correction of the heating pattern in the state where the software is installed.

As still another example of the structure, the setting and the correction of the heating pattern (Steps S11 to S13) are performed by the CPU 13 of the label manufacturing apparatus 1 itself, and only the input means 16 and the display means 17 are connected to the label manufacturing apparatus 1 as separate components.

Figure 9:
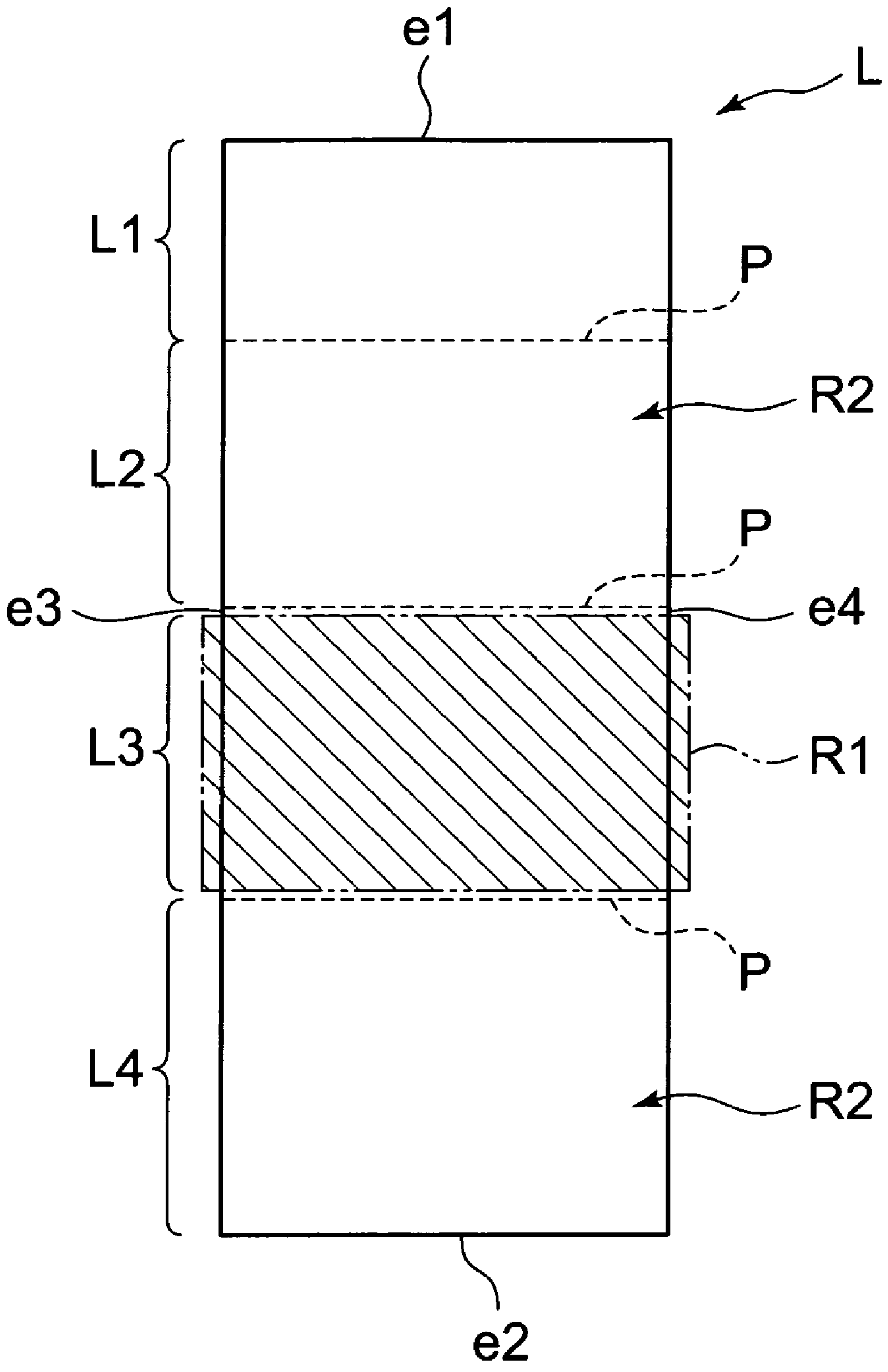
FIG. 9 is a schematic diagram illustrating an example of a label including an adhesive portion and a non-adhesive portion disposed in a mixed manner.

Lastly, an example of application of the label including the adhesive portion and the non-adhesive portion disposed in a mixed manner is be described. The label L illustrated in FIG. 9 includes four portions L1 to L4. Only the third portion L3 is the adhesive portion (illustrated with hatching), and other portions L1, L2, and L4 are all the non-adhesive portions. This label L is a slip for delivering a package, and the four portions L1 to L4 have substantially the same described contents, i.e., addresses, names, and telephone numbers of the sender and the receiver, and information necessary for the delivery (desired date and time of delivery, delivery fee, type of contents, and the like). The perforations P as tear-off lines are provided to the boundaries between the respective portions of the label L.

An example of a using method of this label L is described. First, a delivery company, which received a request for delivery from a sender who asks the delivery, manufactures the label illustrated in FIG. 9 in accordance with the manufacturing method described above. Then, the sender who asks the delivery or the delivery company fills in the portions L1 to L4 of the label L with necessary items, and the first portion L1 that is the non-adhesive portion is cut off and saved by the sender who asks the delivery as a copy for sender. On the other hand, the third portion L3 that is the adhesive portion is attached onto the package, and the delivery company carries the package holding the second to the fourth portions L2 to L4 thereon. The delivery company cuts off the second portion L2 that is the non-adhesive portion at an appropriate timing as necessary so as to save it as a copy for pickup and delivery. When the package holding the third portion L3 and the fourth portion L4 is carried and delivered to the receiver in this way, the receiver cuts off the fourth portion L4 that is the non-adhesive portion so as to save it as a copy for receiver. Finally, only the third portion L3 that is the adhesive portion remains held on the package.

In such the label L, by adopting the manufacturing method described above, the heated part R1 (illustrated with hatching) extends to the outside of the label from the end portions e3 and e4 in the width direction (left and right direction) in the third portion L3 and is the range from the perforations P to the inside of the third portion L3. Therefore, even if the heated part is shifted in the width direction (left and right direction) due to some mechanical error or the like, substantially the entire of the third portion L3 is thermally activated so as to develop adhesive properties. However, the vicinity of the perforation P in the third portion L3 is not activated and is in the non-adhesive state. For this reason, even if some mechanical error or the like exists, it is not necessary to peel off the portion stuck to the package when the second portion L2 or the fourth portion L4 is cut off. Therefore, the cutting off can be performed easily, and a risk of tearing the label at a part other than the perforation by mistake can be prevented. Further, the example of the label L illustrated in FIG. 9 has no adhesive portion in the leading end portion e1 and in the trailing end portion e2 of the label L. Therefore, the correction of expanding the heating pattern at the end portions e1 and e2 has no meaning in particular, and hence the correction can be omitted.

What is claimed is:

1. A label manufacturing method for heating at least a part of a heat sensitive adhesive sheet to develop adhesive properties by using a thermal head having a plurality of heating elements and by using transporting means for transporting the heat sensitive adhesive sheet so as to pass the heat sensitive adhesive sheet through a position contacting with the heating elements of the thermal head, the method comprising the steps of:

generating image data on an image area of the heat sensitive adhesive sheet and performing an image editing process so as to divide the image area into at least two types of parts and to set one of the two types of parts as a heated part and the other part as a non-heated part;

inputting an edited image obtained as a result of the image editing process as a heating pattern; and driving the thermal head and the transporting means based on the input heating pattern and selectively operating the plurality of heating elements of the thermal head in timed synchronization with transporting of the heat sensitive adhesive sheet by the transporting means, to thereby heat at least a part of the heat sensitive adhesive sheet to develop adhesive properties;

wherein in the generating step, the image area is displayed as a binary image including a colored part and a non-colored part on a display means; and wherein the image editing process arbitrarily adjusts shapes, sizes, and positions of the colored part and the non-colored part, and sets one of the colored part and the non-colored part as the heated part and the other part as the non-heated part.

2. A label manufacturing method according to claim 1; wherein in the generating step, the image data is generated in the image area in a matrix divided into dots having substantially the same size as a size of one of the heating elements; and wherein in the image editing process, each of the dots can be independently set as any one of the heated part and the non-heated part.

3. A label manufacturing method according to claim 2; further comprising the step of correcting the input heating pattern; and wherein the driving step comprises driving the thermal head and the transporting means based on the corrected heating pattern and selectively operating the plurality of heating elements of the thermal head in timed synchronization with transporting of the heat sensitive adhesive sheet by the transporting means, to thereby heat only a part of the heat sensitive adhesive sheet corresponding to the part set as the heated part in the corrected heating pattern to develop adhesive properties.

4. A label manufacturing method according to claim 1; further comprising the step of correcting the input heating pattern; and wherein the driving step comprises driving the thermal head and the transporting means based on the corrected heating pattern and selectively operating the plurality of heating elements of the thermal head in timed synchronization with transporting of the heat sensitive adhesive sheet by the transporting means, to thereby heat only a part of the heat sensitive adhesive sheet corresponding to the part set as the heated part in the corrected heating pattern to develop adhesive properties.

5. A label manufacturing method for heating at least a part of a heat sensitive adhesive sheet to develop adhesive properties by using a thermal head having a plurality of heating elements and by using transporting means for transporting the heat sensitive adhesive sheet so as to pass the heat sensitive adhesive sheet through a position contacting with the heating elements of the thermal head, the method comprising the steps of:

generating image data on an image area of the heat sensitive adhesive sheet and performing an image editing process so as to divide the image area into at least two types of parts and to set one of the two types of parts as a heated part and the other part as a non-heated part;

inputting an edited image obtained as a result of the image editing process as a heating pattern;

correcting the input heating pattern; and driving the thermal head and the transporting means based on the corrected heating pattern and selectively operating the plurality of heating elements of the thermal head in timed synchronization with transporting of the heat sensitive adhesive sheet by the transporting means, to thereby heat only a part of the heat sensitive adhesive sheet corresponding to the part set as the heated part in the corrected heating pattern to develop adhesive properties.

6. A label manufacturing method according to claim 5; wherein the correcting step comprises correcting the input heating pattern so that a rim portion of the input heating pattern is expanded outward by a predetermined distance in at least one direction.

7. A label manufacturing method according to claim 6; wherein the correcting step further comprises correcting the input heating pattern so that the rim portion of the input heating pattern is expanded outward by the predetermined distance at a leading end of the heat sensitive adhesive sheet in a transporting direction and at both end portions of the heat sensitive adhesive sheet in a width direction perpendicular to the transporting direction.

8. A label manufacturing method according to claim 7; wherein the correcting step further comprises correcting the input heating pattern so that an edge portion of the heated part is set back by the predetermined distance at a boundary between the heated part and the non-heated part of the input heating pattern.

9. A label manufacturing method according to claim 6; wherein the correcting step further comprises correcting the input heating pattern so that an edge portion of the heated part is set back by the predetermined distance at a boundary between the heated part and the non-heated part of the input heating pattern.

10. A label manufacturing method according to claim 5; wherein the correcting step further comprises correcting the input heating pattern so that an edge portion of the heated part is set back by the predetermined distance at a boundary between the heated part and the non-heated part of the input heating pattern.

11. A label manufacturing system comprising:

a label manufacturing apparatus including a thermal head having a plurality of heating elements and transporting means for transporting a heat sensitive adhesive sheet so as to pass the heat sensitive adhesive sheet through a position contacting with the heating elements of the thermal to heat at least a part of the heat sensitive adhesive sheet to develop adhesive properties;

display means for displaying an image area of the heat sensitive adhesive sheet; and input means for performing an image editing process for dividing the image area displayed by the display means into at least two types of parts, setting one of the two types of parts as a heated part and the other part as a non-heated part, and inputting into a storage means an edited image obtained as a result of the image editing process as a heating pattern;

wherein the display means generates image data in the image area in a matrix divided into dots having substantially the same size as a size of one of the heating elements, so as to display the image area as a binary image including a colored part and a non-colored part; and wherein the input means arbitrarily adjusts shapes, sizes, and positions of the colored part and the non-colored part by independently setting each of the dots as any one of the colored part and the non-colored part in the image editing process, so as to set one of the colored part and the non-colored part as the heated part while setting the other of the colored part and non-colored part as the non-heated part.

12. A label manufacturing system according to claim 11; wherein control means is disposed in the label manufacturing apparatus; and wherein the input means and the display means are disposed in the label manufacturing apparatus or are disposed externally of and connected to the label manufacturing apparatus.

13. A label manufacturing system according to claim 11; further comprising control means for correcting the input heating pattern, driving the thermal head and the transporting means in accordance with the corrected heating pattern, and selectively operating the plurality of heating elements of the thermal head in timed synchronization with transportation of the heat sensitive adhesive sheet by the transporting means so that only a part of the heat sensitive adhesive sheet corresponding to the part set as the heated part in the corrected heating pattern is heated.

14. A label manufacturing system according to claim 11; wherein control means is disposed in the label manufacturing apparatus; and wherein the input means and the display means are disposed in the label manufacturing apparatus or are disposed externally of and connected to the label manufacturing apparatus.

15. A label manufacturing system comprising:

a label manufacturing apparatus including a thermal head having a plurality of heating elements and transporting means for transporting a heat sensitive adhesive sheet so as to pass the heat sensitive adhesive sheet through a position contacting with the heating elements of the thermal to heat at least a part of the heat sensitive adhesive sheet to develop adhesive properties;

display means for displaying an image area of the heat sensitive adhesive sheet;

input means for performing an image editing process for dividing the image area displayed by the display means into at least two types of parts, setting one of the two types of parts as a heated part and the other part as a non-heated part, and inputting into a storage means an edited image obtained as a result of the image editing process as a heating pattern; and control means for correcting the input heating pattern, driving the thermal head and the transporting means in accordance with the corrected heating pattern, and selectively operating the plurality of heating elements of the thermal head in timed synchronization with transportation of the heat sensitive adhesive sheet by the transporting means so that only a part of the heat sensitive adhesive sheet corresponding to the part set as the heated part in the corrected heating pattern is heated.

16. A label manufacturing system according to claim 15; wherein the control means corrects the input heating pattern so that a rim portion of the input heating pattern is expanded outward by a predetermined distance at least in one direction.

17. A label manufacturing system according to claim 16; wherein the control means corrects the input heating pattern so that the rim portion of the input heating pattern is expanded outward by the predetermined distance at a leading end of the heat sensitive adhesive sheet in a transporting direction and at both end portions of the heat sensitive adhesive sheet in a width direction perpendicular to the transporting direction.

18. A label manufacturing system according to claim 17; wherein the control means corrects the input heating pattern so that an edge portion of the heated part is set back by the predetermined distance at a boundary between the heated part and the non-heated part of the input heating pattern.

19. A label manufacturing system according to claim 17; wherein control means is disposed in the label manufacturing apparatus; and wherein the input means and the display means are disposed in the label manufacturing apparatus or are disposed externally of and connected to the label manufacturing apparatus.

20. A label manufacturing system according to claim 16; wherein the control means corrects the input heating pattern so that an edge portion of the heated part is set back by the predetermined distance at a boundary between the heated part and the non-heated part of the input heating pattern.

21. A label manufacturing system according to claim 16; wherein control means is disposed in the label manufacturing apparatus; and wherein the input means and the display means are disposed in the label manufacturing apparatus or are disposed externally of and connected to the label manufacturing apparatus.

22. A label manufacturing system according to claim 15; wherein the control means corrects the input heating pattern so that an edge portion of the heated part is set back by the predetermined distance at a boundary between the heated part and the non-heated part of the input heating pattern.

23. A label manufacturing system according to claim 22; wherein control means is disposed in the label manufacturing apparatus; and wherein the input means and the display means are disposed in the label manufacturing apparatus or are disposed externally of and connected to the label manufacturing apparatus.

24. A label manufacturing system according to claim 15; wherein control means is disposed in the label manufacturing apparatus; and wherein the input means and the display means are disposed in the label manufacturing apparatus or are disposed externally of and connected to the label manufacturing apparatus.

* * * * *